US011879102B2

(12) United States Patent
Van Zijl et al.

(10) Patent No.: US 11,879,102 B2
(45) Date of Patent: *Jan. 23, 2024

(54) PROCESS FOR THE PREPARATION OF POLYETHYLENES FROM WASTE PLASTIC FEEDSTOCKS

(71) Applicant: SABIC GLOBAL TECHNOLOGIES B.V., Bergen Op Zoom (NL)

(72) Inventors: Anthoni Van Zijl, Geleen (NL); Nicolas Goyheneix, Geleen (NL); Lara Galan-Sanchez, Geleen (NL); Christoph Roosen, Geleen (NL); Johan Pastwa, Geleen (NL); Safa Farajzadeh Bibalan, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/424,701

(22) PCT Filed: Jan. 24, 2020

(86) PCT No.: PCT/EP2020/051729
§ 371 (c)(1),
(2) Date: Jul. 21, 2021

(87) PCT Pub. No.: WO2020/152319
PCT Pub. Date: Jul. 30, 2020

(65) Prior Publication Data
US 2022/0135889 A1    May 5, 2022

(30) Foreign Application Priority Data

Jan. 24, 2019  (EP) ..................... 19153458
Jan. 28, 2019  (EP) ..................... 19153897
Feb. 14, 2019  (EP) ..................... 19157064
Feb. 14, 2019  (EP) ..................... 19157324
Feb. 19, 2019  (EP) ..................... 19157898

(51) Int. Cl.
| | | |
|---|---|---|
| *C10G 57/02* | (2006.01) | |
| *C08J 11/14* | (2006.01) | |
| *C08L 23/06* | (2006.01) | |
| *B29B 17/04* | (2006.01) | |
| *C08J 11/00* | (2006.01) | |
| *C10G 9/14* | (2006.01) | |
| *C10G 50/00* | (2006.01) | |
| *C10G 69/12* | (2006.01) | |
| *C10G 1/10* | (2006.01) | |
| *C10G 47/00* | (2006.01) | |

(Continued)

(52) U.S. Cl.
CPC .............. *C10G 57/02* (2013.01); *B29B 17/02* (2013.01); *B29B 17/04* (2013.01); *B29C 48/277* (2019.02); *C08J 11/00* (2013.01); *C08J 11/06* (2013.01); *C08J 11/12* (2013.01); *C08J 11/14* (2013.01); *C08L 23/06* (2013.01); *C10G 1/10* (2013.01); *C10G 9/14* (2013.01); *C10G 47/00* (2013.01); *C10G 50/00* (2013.01); *C10G 51/023* (2013.01); *C10G 69/12* (2013.01); *B29B 2017/0089* (2013.01); *B29B 2017/0203* (2013.01); *B29B 2017/0496* (2013.01); *C08J 2300/30* (2013.01); *C08L 2207/20* (2013.01); *C10G 2300/1003* (2013.01); *C10G 2300/1085* (2013.01); *C10G 2300/1096* (2013.01); *C10G 2300/201* (2013.01); *C10G 2400/20* (2013.01)

(58) Field of Classification Search
None
See application file for complete search history.

(56) References Cited

U.S. PATENT DOCUMENTS

| | | |
|---|---|---|
| 5,364,995 A | 11/1994 | Kirkwood et al. |
| 5,639,937 A | 6/1997 | Hover |

(Continued)

FOREIGN PATENT DOCUMENTS

| | | |
|---|---|---|
| WO | 2016142809 A1 | 9/2016 |
| WO | 2018025104 A1 | 2/2018 |
| WO | 2018055555 A1 | 3/2018 |

OTHER PUBLICATIONS

Achilias et al., "Recent Advances in the Chemical Recycling of Polymers (PP, PS, LDPE, HDPE, PVC, PC, Nylon, PMMA)" Material Recycling—Trends and Perspectives, Mar. 1, 2012, pp. 1-64.

(Continued)

*Primary Examiner* — Tam M Nguyen
(74) *Attorney, Agent, or Firm* — CANTOR COLBURN LLP

(57) ABSTRACT

The present invention relates to a process for the production of ethylene-based polymers from waste plastics feedstocks comprising the steps in this order of: (a) providing a hydrocarbon stream A obtained by hydrotreatment of a pyrolysis oil produced from a waste plastics feedstock; (b) optionally providing a hydrocarbon stream B; (c) supplying a feed C comprising a fraction of the hydrocarbon stream A and optionally a fraction of the hydrocarbon stream B to a thermal cracker furnace comprising cracking coil(s); (d) performing a thermal cracking operation in the presence of steam to obtain a cracked hydrocarbon stream D; (e) supplying the cracked hydrocarbon stream D to a separation unit; (f) performing a separation operation in the separation unit to obtain a product stream E comprising ethylene; (g) supplying the product stream E to a polymerisation reactor; and (h) performing a polymerisation reaction in the polymerisation reactor to obtain an ethylene-based polymer; wherein in step (d): • · the coil outlet temperature is ≥ 800 and ≤ 870° C., preferably ≥ 820 and ≤ 870° C.; and • · the weight ratio of steam to feed C is >0.3 and <0.8.

18 Claims, No Drawings

(51) Int. Cl.
*B29C 48/275* (2019.01)
*B29B 17/02* (2006.01)
*C08J 11/06* (2006.01)
*C10G 51/02* (2006.01)
*C08J 11/12* (2006.01)
*B29B 17/00* (2006.01)

(56) References Cited

U.S. PATENT DOCUMENTS

| | | | |
|---|---|---|---|
| 5,981,818 A | 11/1999 | Purvis et al. | |
| 6,111,156 A | 8/2000 | Oballa et al. | |
| 2012/0310023 A1* | 12/2012 | Huang | C10G 1/002 585/241 |
| 2014/0228606 A1 | 8/2014 | Narayanaswamy et al. | |
| 2015/0232395 A1* | 8/2015 | Nyce | C07C 1/0435 585/329 |
| 2016/0264874 A1 | 9/2016 | Narayanaswamy et al. | |
| 2016/0362609 A1* | 12/2016 | Ward | C10G 69/02 |
| 2020/0017772 A1* | 1/2020 | Ramamurthy | C10G 47/12 |
| 2020/0017773 A1* | 1/2020 | Ramamurthy | C07C 5/277 |
| 2021/0130699 A1* | 5/2021 | Bitting | B01J 19/243 |
| 2021/0139620 A1* | 5/2021 | Slivensky | C07C 5/48 |
| 2021/0189248 A1* | 6/2021 | Timken | C10G 35/02 |
| 2021/0189250 A1* | 6/2021 | Timken | C10G 73/44 |
| 2021/0189251 A1* | 6/2021 | Timken | C10G 1/002 |
| 2021/0189252 A1* | 6/2021 | Timken | C07C 7/1485 |
| 2021/0189253 A1* | 6/2021 | Timken | C10B 53/07 |
| 2021/0189254 A1* | 6/2021 | Timken | C10G 1/10 |
| 2021/0301209 A1* | 9/2021 | Timken | C10G 31/06 |
| 2021/0301210 A1* | 9/2021 | Timken | C10G 1/002 |
| 2021/0332300 A1* | 10/2021 | Timken | C10G 31/09 |
| 2021/0363432 A1* | 11/2021 | Bitting | C10B 49/22 |
| 2022/0010213 A1* | 1/2022 | Sun | C10B 57/06 |
| 2022/0041940 A1* | 2/2022 | Pradeep | C10G 11/182 |
| 2022/0073826 A1 | 3/2022 | Van Zijl et al. | |
| 2022/0089957 A1* | 3/2022 | Van Zijl | C10G 47/00 |
| 2022/0097279 A1 | 3/2022 | Van Zijl et al. | |
| 2022/0098497 A1 | 3/2022 | Van Zijl et al. | |

OTHER PUBLICATIONS

Fatima, "Chemical Recycle of Plastics", American Journal of Engineering Research (AJER) American Journal of Engineering Research, Jan. 1, 2014.
International Search Report for International Application No. PCT/EP2020/051729, International Filing Date Jan. 24, 2020, dated Mar. 17, 2020, 7 pages.
Written Opinion for International Application No. PCT/EP2020/051729, International Filing Date Jan. 24, 2020, dated Mar. 17, 2020, 9 pages.
E. Hajekova and M. Bajus (2005), "Recycling of low-density polyethylene and polypropylene via copyrolysis of polyalkene oil/waxes with naphtha: product distribution and coke formation", Journal of Analytical and Applied Pyrolysis, 74, pp. 270-281.
Third Party Observations against EP Application No. 20701074.5 published as EP3914672, dated Nov. 30, 2021, 6 pages.
European Office Action for Application No. 20701074.5, dated Jun. 29, 2022, 8 pages.

* cited by examiner

PROCESS FOR THE PREPARATION OF POLYETHYLENES FROM WASTE PLASTIC FEEDSTOCKS

CROSS REFERENCE TO RELATED APPLICATIONS

This application is a National Stage application of PCT/EP2020/051729, filed Jan. 24, 2020, which claims the benefit of European Application No. 19157898.8, filed Feb. 19, 2019, European Application No. 19157064.7, filed Feb. 14, 2019, European Application No. 19157324.5, filed Feb. 14, 2019, European Application No. 19153897.4, filed Jan. 28, 2019, and European Application No. 19153458.5, filed Jan. 24, 2019, all of which are incorporated by reference in their entirety herein.

The present invention relates to a process for the preparation of polyethylenes from products originating from waste plastic feedstocks. In particular, the invention relates to production of polyethylene from products originating from waste plastic feedstocks with improved carbon efficiency towards polyethylene.

Presently, the disposal of plastic materials as a waste poses an increasing environmental issue. With increase of global population, and increase of use of plastic materials per capita, the quantity of plastic material that results as a waste, whether from industrial use or from consumer use, reaches such levels that far-reaching innovations in methods of disposal are rapidly becoming essential. In particular, it is very much desirable that such innovations also contribute to reduction of detrimental environmental issues, such as fossil carbon utilisation and carbon emissions into the atmosphere.

In many cases, at present, waste plastics are processed by incineration, leading to atmospheric carbon emissions, discarded in landfills, or even littered onto land and sea. Such undesired waste disposal increasingly faces societal objections. It is therefore an object of development in industry to find means of processing such waste plastics in a way overcoming the above objections.

One means of achieving such is via processing the waste plastics via chemical conversion processes into a feed material that again can find its way to the renewed production of plastics. Not only would such route allow for the re-use of a waste, with the problems associated to it as presented above, but also could it serve as a replacement of conventional feed materials that are used in the production of plastics.

A particular route for production of plastics, currently by and far the most widespread route, is via first processing of fossil oil or gas derivatives into building blocks for plastics, and further converting these building blocks into plastics via polymerisation processes. A typical example of such involves the preparation of such building blocks, also referred to as monomers, via steam cracking of fossil oil derivatives of the naphtha range. Such monomers include particularly lower mono- and diolefinic compounds, such as ethylene and propylene, next to other valuable chemical building blocks such as aromatics and oxygenated products. These olefinic compounds are on very large scale polymerised into polyolefin materials, particularly polyethylene and polypropylene materials.

As the production of polyethylenes and polypropylenes according to the above route represents a majority part of the global plastics production, and production capacity continues to grow annually, this route would be particularly suitable for utilisation of waste plastics based feed streams to be converted into new polymeric materials. Such route would allow for providing a means to convert plastics to plastics, which is also referred to as circular plastics processing.

In order to be able to process waste plastics as a feed material for steam cracking operations, it has to be provided as a feed to the steam cracker in such way that the cracking process can be operated at the highest of efficiencies, and under sustainable conditions.

In this context, with high cracking efficiency it is meant that the cracking is performed under conditions leading to a maximised production of ethylene as part of the product spectrum that is produced in the steam cracker. Steam cracking involves subjecting a feed stream of hydrocarbons of mixed chemical structure to a high temperature, under high flow velocities, for a certain time. As a result of these conditions, thermal degradation of the chemical compounds in the feed stream occurs, leading to a certain spectrum of desired chemical compounds that find their way into commercial use, either directly or via further chemical conversion processes. Ethylene typically is one of the products that is part of the products that forms part of the product composition that is formed in such steam cracking process.

By sustainable conditions of steam cracking in the context of the present invention is meant that the steam cracking occurs under such conditions of process and feed stream composition that the run duration of the cracking process, which in commercial operation is a continuous process, is as long as possible, before formation of coke or fouling due to contaminants and/or operational conditions that settles on the inside of the tubes which typically are employed in steam crackers as per the present art forces operations to be ceased and reactor tubes to be cleaned. This run duration is very much dependent on the composition of the feed material and the conditions of cracking, and is desirably as long as possible to enable an economic operation of the plant.

The ethylene that is obtained as part of the product composition emerging from the steam cracking process is, upon being subjected to a separation step to isolate it to a desired degree of purity, then converted to polyethylene products via a polymerisation process.

It is now an object of the present invention to provide a process that allows for the production of polyethylene utilising a maximised efficiency of carbon originating from a waste plastics stream.

According to the present invention, that is now achieved by a process for the production of ethylene-based polymers from waste plastics feedstocks comprising the steps in this order of:
(a) providing a hydrocarbon stream A obtained by hydrotreatment of a pyrolysis oil produced from a waste plastics feedstock;
(b) optionally providing a hydrocarbon stream B;
(c) supplying a feed C comprising a fraction of the hydrocarbon stream A and optionally a fraction of the hydrocarbon stream B to a thermal cracker furnace comprising cracking coil(s);
(d) performing a thermal cracking operation in the presence of steam to obtain a cracked hydrocarbon stream 0;
(e) supplying the cracked hydrocarbon stream D to a separation unit;
(f) performing a separation operation in the separation unit to obtain a product stream E comprising ethylene;
(g) supplying the product stream E to a polymerisation reactor; and
(h) performing a polymerisation reaction in the polymerisation reactor to obtain an ethylene-based polymer;
wherein in step (d):
the coil outlet temperature is 800 and ≤870° C., preferably 820 and ≤870° C.; and
the weight ratio of steam to feed C is >0.3 and <0.8.

The process of the present invention allows for optimisation of the quantity of waste plastic material that finds its way back into a polyethylene that is produced as outcome of the process. The higher that quantity is, i.e. the higher the quantity of chemical building blocks that are present in the waste plastic material that are converted to the produced polyethylene, the better the sustainability footprint of the process is. The process allows for circular utilisation of plastics. In addition, the process allows for increased efficiency in the production of polyethylene in that the fraction of ethylene in the cracked hydrocarbon stream D is increased. A further advantage of the process of the present invention is that the overall energy consumption towards polyethylene is reduced.

In the context of the present invention, polyethylenes are also referred to as ethylene-based polymers, which terms are used interchangeably. Polyethylenes or ethylene-based polymers in accordance with the present invention may for example be understood to be polymers comprising >50 wt % of monomeric units that are derived from ethylene, preferably >60 wt %, more preferably >70 wt %, even more preferably >80 wt %, yet even more preferably >90 wt %, with regard to the weight of the polymer.

The weight ratio of steam to feed C may for example be >0.35 and <0.8, preferably >0.35 and <0.75, more preferably >0.40 and <0.70.

The process of the present invention allows for the conversion of the waste plastics material into a polyethylene product.

The waste plastics feedstock that is used for the production of the hydrocarbon stream A of the present process may for example comprise polyolefins, polyesters, thermoplastic elastomers, polyvinyl chlorides, polystyrenes, or polycarbonates.

Waste plastic feedstocks that may be used for the production of the hydrocarbon stream A can be mixtures comprising polyolefins, polyesters, thermoplastic elastomers, polyvinyl chlorides, polystyrenes, or polycarbonates. In particular, the waste plastic feedstock that may be used for the production of the hydrocarbon stream A can be mixtures comprising >25.0 wt % of polyolefins, with regard to the total weight of the waste plastic feedstock. Preferably, the waste plastic feedstock may comprise >40.0 wt % of polyolefins, more preferably >50.0 wt %, even more preferably >60.0 wt %, or >70.0 wt %. The waste plastic feedstock may comprise a fraction of non-thermoplastics materials. Such non-thermoplastic materials may for example be hydrocarbon-based materials, such as rubber materials, but may also be materials including paper, sand and soil. It is an advantage of the present invention that waste plastics feedstocks containing up to 10 wt %, preferably up to 5.0 wt %, more preferably up to 2.0 wt %, of materials selected from paper, sand and soil, and combinations thereof, may be used in a process for preparation of polyethylene. This allows for the processing of such feedstocks without the need for cleaning processes that may require use of solvents or detergents.

For example, the waste plastics feedstock may comprise ≤10.0 wt % of ingredients being the sum of the content of glass, paper, metal, cardboard, compostable waste, wood, stone, textiles, rubber materials and superabsorbent hygiene products, with regard to the total weight of the waste plastics feedstock.

The waste plastics feedstock may for example comprise ≥90.0 wt % of polymeric material, with regard to the total weight of the waste plastics feedstock.

The waste plastics feedstock may for example comprise a quantity of polyesters. For example, the waste plastics feedstock may comprise <20.0 wt % of polyesters, preferably <15.0 wt %, more preferably <10.0 wt %, even more preferably <5.0 wt %, even further preferably <2.0 wt %. The waste plastics feedstock may in certain embodiments be free from polyesters.

A particular type of polyester that typically can be present in waste plastic feedstocks such as employed in the preparation of the hydrocarbon stream A as used in the present process is polyethylene terephthalate, which may also be referred to as PET. The waste plastics feedstock may for example comprise a quantity of PET. For example, the waste plastics feedstock may comprise <20.0 wt % of PET, preferably <15.0 wt %, more preferably <10.0 wt %, even more preferably <5.0 wt %, even further preferably <2.0 wt %. The waste plastics feedstock may in certain embodiments be free from PET.

Polyesters such as PET contain oxygen atoms in their polymeric chains. The presence of compounds comprising oxygen atoms in the hydrocarbon stream A is subject to certain limitation, since an excess quantity of oxygen atoms in the compounds that are supplied to the thermal cracker furnace may lead to problems including fouling and corrosion in the down-stream processing of the cracked hydrocarbon stream D exiting from the thermal cracker furnace. Accordingly, there is a desire to control or even minimise the quantity of oxygen-containing polymers in the waste plastics feedstock that is used to prepare the hydrocarbon stream A.

The waste plastics feedstock may for example comprise a quantity of polyamides. For example, the waste plastics feedstock may comprise <20.0 wt % of polyamides, preferably <15.0 wt %, more preferably <10.0 wt %, even more preferably <5.0 wt %, even further preferably <2.0 wt %. The waste plastics feedstock may in certain embodiments be free from polyamides.

Particular types of polyamide that typically can be present in waste plastic feedstocks such as employed in the preparation of the hydrocarbon stream A as used in the present process are polyamide 6 and polyamide 6,6, which may also be referred to as PA6 and PA66, respectively. The waste plastics feedstock may for example comprise a quantity of PA6 or PA66. For example, the waste plastics feedstock may comprise <20.0 wt % of total of PA 6 and PA66, preferably <15.0 wt %, more preferably <10.0 wt %, even more preferably <5.0 wt %, even further preferably <2.0 wt %. The waste plastics feedstock may in certain embodiments be free from PA6 and/or PA66.

The waste plastics feedstock may for example comprise a quantity of polyvinyl chlorides, which may also be referred to as PVC. For example, the waste plastics feedstock may comprise <5.0 wt % of PVC, preferably <2.0 wt %, more preferably <1.0 wt %, even more preferably <0.5 wt %, even further preferably <0.1 wt %. The waste plastics feedstock may in certain embodiments be free from PVC.

The waste plastics feedstock may for example comprise
    <20.0 wt %, preferably <10.0 wt % of polyesters; and/or
    <20.0 wt %, preferably <10.0 wt % of polyamides; and/or
    <2.0 wt %, preferably <1.0 wt % of polyvinyl chloride
    with regard to the total weight of polymeric material in the waste plastics feedstock.

The presented percentages of polyesters, polyamides and PVC in the waste plastics feedstock are to be understood to be percentages by weight of the total weight of polymeric material present in the waste plastics feedstock.

The waste plastic feedstock may further comprise a quantity of moisture, for example the waste plastics feedstock may contain up to 20.0 wt % of moisture, preferably up to 10.0 wt %, more preferably up to 5.0 wt %.

The present process allows for the cracked hydrocarbon stream D to contain a particularly high fraction of ethylene. The higher the fraction of ethylene in the cracked product, the better the efficiency of the process towards polyethylene is.

It is preferred that the hydrocarbon stream A has an initial boiling point >25° C. and a final boiling point of <350° C., wherein the initial boiling point and the final boiling point are determined in accordance with ASTM D86 (2012).

The hydrocarbon stream A may for example have an initial boiling point of >25° C., preferably of >30° C., more preferably of >35° C., even more preferably of >40° C. The hydrocarbon stream A may for example have an initial boiling point of <100° C., preferably <90° C., more preferably <80° C., even more preferably <70° C., or <60° C., or <50° C. The hydrocarbon stream A may for example have an initial boiling point of >25° C. and <100° C., preferably of >35° C. and <80° C.

The hydrocarbon stream A may for example have a final boiling point of <350° C., preferably of <325° C., more preferably of <300° C., even more preferably of <275° C., even more preferably of <250° C., or <225° C., or <200° C. The hydrocarbon stream A may for example have a final boiling point of >150° C., preferably >175° C., more preferably >200° C., even more preferably >250° C., or >275° C., or >300° C. The hydrocarbon stream A may for example have a final boiling point of >150° C. and <350° C., preferably >200° C. and <325° C., more preferably >200° C. and <300° C.

The hydrocarbon stream A is a material stream that is obtained by treatment of a waste plastics feedstock. For example, hydrocarbon stream A may be obtained by processing a waste plastics stream in a pyrolysis unit followed by a hydrogenation treatment of the product obtained from the pyrolysis unit.

Such pyrolysis unit may be a continuously operating unit, wherein a stream of waste plastics is continuously supplied to the unit and at least a liquid stream comprising pyrolysis products is continuously obtained from the unit. Alternatively, the pyrolysis unit may be a batch-wise operating using wherein a quantity of waste plastics is introduced into the unit, subjected to pyrolysis conditions, and subsequently at least a liquid stream comprising pyrolysis products is obtained from the unit.

The pyrolysis process that is performed in the pyrolysis unit may be a low-severity pyrolysis process or a high-severity pyrolysis process. In a low-severity pyrolysis process, the pyrolysis may be performed at a temperature of ≥250° C. and ≤450° C., preferably ≥275° C. and ≤425° C., more preferably ≥300° C. and ≤400° C. Alternatively, the pyrolysis process may be a high-severity process performed at a temperature of ≥450° C. and ≤750° C., preferably ≥500° C. and ≤700° C., more preferably ≥550° C. and ≤650° C.

The pyrolysis process may be a catalytic process. In such pyrolysis process, for example a quantity of a zeolite catalyst such as a ZSM-5 zeolite catalyst may be used. In such pyrolysis process, for example a quantity of spent FCC catalyst may be used. In particular, a composition comprising a quantity of ZSM-5 catalyst and a quantity of spent FCC catalyst may be used. For example, a composition comprising a quantity of ZSM-5 and a quantity of spent FCC catalyst may be used, wherein the weight ratio of the spent FCC catalyst to the ZSM-5 catalyst is between 0.5 and 5.0, such as between 1.0 and 3.0.

From the pyrolysis process, a liquid hydrocarbon stream may be obtained. The liquid hydrocarbon stream may for example comprise a quantity of n-paraffins, a quantity of iso-paraffins, a quantity of olefins, a quantity of naphthenes, and/or a quantity of aromatics. The liquid hydrocarbon stream may for example comprise a quantity of n-paraffins, a quantity of iso-paraffins, a quantity of olefins, a quantity of naphthenes, and a quantity of aromatics.

In the context of the present invention, n-paraffins that may be present in the liquid hydrocarbon stream from the pyrolysis process may for example include n-alkanes having 3 to 40 carbon atoms. The iso-paraffins that may be present in the liquid hydrocarbon stream from the pyrolysis process may for example have 3 to 40 carbon atoms. The naphtenes that may be present in the liquid hydrocarbon stream from the pyrolysis process may for example have 3 to 40 carbon atoms. The aromatics that may be present in the liquid hydrocarbon stream from the pyrolysis process may for example have 6 to 40 carbon atoms.

The liquid hydrocarbon stream from the pyrolysis process may for example comprise ≥25.0 and ≤95.0 wt % of n-paraffins, with regard to the total weight of the liquid hydrocarbon stream from the pyrolysis process. Preferably, the liquid hydrocarbon stream from the pyrolysis process comprises ≥25.0 and ≤80.0 wt % of n-paraffins, more preferably ≥25.0 and ≤70.0 wt %, even more preferably ≥25.0 and ≤50.0 wt %.

The liquid hydrocarbon stream from the pyrolysis process may for example comprise ≥5.0 and ≤40.0 wt % of iso-paraffins, with regard to the total weight of the hydrocarbon stream A. Preferably, the liquid hydrocarbon stream from the pyrolysis process comprises ≥5.0 and ≤30.0 wt % of iso-paraffins, more preferably ≥7.5 wt % and ≤25.0 wt %.

The liquid hydrocarbon stream from the pyrolysis process may for example comprise ≤50.0 wt % of olefins, with regard to the total weight of the liquid hydrocarbon stream from the pyrolysis process. Preferably, the liquid hydrocarbon stream from the pyrolysis process comprises ≤40.0 wt % of olefins, more preferably ≤35.0 wt %, even more preferably ≤30.0 wt %.

The liquid hydrocarbon stream from the pyrolysis process may for example comprise ≥5.0 and ≤50.0 wt % of olefins, with regard to the total weight of the liquid hydrocarbon stream from the pyrolysis process. Preferably, the liquid hydrocarbon stream from the pyrolysis process comprises ≥10.0 and ≤40.0 wt % of olefins, more preferably ≥15.0 and ≤35.0 wt %.

The liquid hydrocarbon stream from the pyrolysis process may for example comprise ≥5.0 and ≤20.0 wt % of naphthenes, with regard to the total weight liquid hydrocarbon stream from the pyrolysis process. Preferably, the liquid hydrocarbon stream from the pyrolysis process comprises ≥5.0 and ≤15.0 wt % of naphthenes, more preferably ≥7.5 wt % and ≤15.0 wt %.

The liquid hydrocarbon stream from the pyrolysis process may for example comprise ≥5.0 and ≤15.0 wt % of aromatics, with regard to the total weight liquid hydrocarbon stream from the pyrolysis process. Preferably, the liquid hydrocarbon stream from the pyrolysis process comprises ≥5.0 and ≤12.5 wt % of aromatics, more preferably ≥7.5 wt % and ≤12.5 wt %.

The liquid hydrocarbon stream from the pyrolysis process may for example comprise:
- ≥25.0 and ≤95.0 wt %, preferably ≥25.0 and ≤70.0 wt %, more preferably ≥25.0 and ≤50.0 wt %, of n-paraffins; and/or
- ≥5.0 and ≤20.0 wt %, preferably ≥5.0 and ≤15.0 wt %, more preferably ≥7.5 and ≤15.0 wt %, of iso-paraffins; and/or ≥5.0 and ≤50.0 wt %, preferably ≥10.0 and ≤40.0 wt %, more preferably ≥15.0 and ≤35.0 wt %, of olefins; and/or ≥5.0 and ≤20.0 wt %, preferably ≥5.0 and ≤15.0 wt %, more preferably ≥7.5 and ≤15.0 wt %, of naphtenes; and/or ≥5.0 and ≤15.0 wt %, preferably ≥5.0 and ≤12.5 wt %, more preferably ≥7.5 and ≤12.5 wt %, of aromatics with regard to the total weight of the liquid hydrocarbon stream from the pyrolysis process.

In the context of the present invention, the atomic chlorine content is to be understood to be the total weight of chlorine atoms present in molecules in the hydrocarbon stream as fraction of the total weight of the hydrocarbon stream. Also, the atomic nitrogen content is to be understood to be the total weight of nitrogen atoms present in molecules in the hydrocarbon stream as fraction of the total weight of the hydrocarbon stream.

The liquid hydrocarbon stream from the pyrolysis process may for example comprise a certain quantity of contaminants. For example, the liquid hydrocarbon stream from the pyrolysis process may contain a quantity of compounds comprising chlorine atoms. The quantity of compounds comprising chlorine atoms may be expressed as the atomic chlorine content of the liquid hydrocarbon stream from the pyrolysis process. For example, the liquid hydrocarbon stream from the pyrolysis process may have an atomic chlorine content of <800 ppm by weight, as determined in accordance with ASTM UOP 779-08, preferably <700 ppm, more preferably <600 ppm, even more preferably <500 ppm, even more preferably <400 ppm.

The liquid hydrocarbon stream from the pyrolysis process may comprise a quantity of compounds comprising nitrogen atoms. The quantity of compounds comprising nitrogen atoms may be expressed as the atomic nitrogen content of the liquid hydrocarbon stream from the pyrolysis process. For example, the liquid hydrocarbon stream from the pyrolysis process may have an atomic nitrogen content of <1600 ppm by weight, as determined in accordance with ASTM D5762 (2012), preferably <1500 ppm, more preferably <1400 ppm, even more preferably <1300 ppm, even more preferably <1200 ppm, or <1100 ppm, or <1000 ppm. For example, the liquid hydrocarbon stream from the pyrolysis process may have an atomic nitrogen content of <100 ppm by weight as determined in accordance with ASTM D4629 (2017).

The liquid hydrocarbon stream from the pyrolysis process may comprise a quantity of compounds containing olefinic unsaturations. An indication for the quantity of olefinic unsaturations is the bromine number of the hydrocarbon stream. The bromine number indicates the quantity of bromine in g that reacts with 100 g of the hydrocarbon specimen when tested under the conditions of ASTM D1159-07 (2012). For example, the liquid hydrocarbon stream from the pyrolysis process as used in the process of the present invention may have a bromine number of <100, preferably <95, more preferably <90, even more preferably <85.

The liquid hydrocarbon stream from the pyrolysis process may be subjected to a hydrotreatment process to result in the hydrocarbon stream A that may be supplied to the process for preparation of ethylene-based polymers according to the present invention. Such hydrotreatment process may be a process in which the liquid hydrocarbon stream from the pyrolysis process is subjected to hydrogen, such as in the presence of a catalyst.

The hydrotreatment process may involve hydrogenation, hydrocracking, hydrodearomatisation, hydrodesulfurisation, and hydrodenitrification. The hydrotreatment may be performed in a reactor vessel operated at temperatures of between 200° C. and 500° C. The hydrotreatment may be performed at a pressure of up to 25 MPa, preferably up to 20 MPa.

The liquid product that is obtained from the hydrotreatment step may be supplied to the process of the invention as hydrocarbon stream A. The hydrocarbon stream A may for example comprise a quantity of n-paraffins, a quantity of iso-paraffins, a quantity of olefins, a quantity of naphthenes, and/or a quantity of aromatics. The liquid hydrocarbon stream may for example comprise a quantity of n-paraffins, a quantity of iso-paraffins, a quantity of olefins, a quantity of naphthenes, and a quantity of aromatics.

In the context of the present invention, n-paraffins that may be present in the hydrocarbon stream A may for example include n-alkanes having 3 to 40 carbon atoms. The iso-paraffins that may be present in the hydrocarbon stream A may for example have 3 to 40 carbon atoms. The naphtenes that may be present in the hydrocarbon stream A may for example have 3 to 40 carbon atoms. The aromatics that may be present in the hydrocarbon stream A may for example have 6 to 40 carbon atoms.

The hydrocarbon stream A may for example comprise ≥25.0 and ≤95.0 wt % of n-paraffins, with regard to the total weight of the hydrocarbon stream A. Preferably, the hydrocarbon stream A comprises ≥25.0 and ≤80.0 wt % of n-paraffins, more preferably ≥25.0 and ≤70.0 wt %.

The hydrocarbon stream A may for example comprise ≥5.0 and ≤70.0 wt % of iso-paraffins, with regard to the total weight of the hydrocarbon stream A. Preferably, the hydrocarbon stream A comprises ≥5.0 and ≤50.0 wt % of iso-paraffins, more preferably ≥7.5 wt % and ≤40.0 wt %.

The hydrocarbon stream A may for example comprise ≤5.0 wt % of olefins, with regard to the total weight of the hydrocarbon stream A. Preferably, the hydrocarbon stream A comprises ≤2.0 wt % of olefins, more preferably ≤1.0 wt %.

The hydrocarbon stream A may for example comprise ≥5.0 and ≤20.0 wt % of napththenes, with regard to the total weight of the hydrocarbon stream A. Preferably, the hydrocarbon stream A comprises ≥5.0 and ≤15.0 wt % of naphthenes, more preferably ≥7.5 wt % and ≤15.0 wt %.

The hydrocarbon stream A may for example comprise ≥5.0 and ≤15.0 wt % of aromatics, with regard to the total weight of the hydrocarbon stream A. Preferably, the hydrocarbon stream A comprises ≥5.0 and ≤12.5 wt % of aromatics, more preferably ≥7.5 wt % and ≤12.5 wt %.

The hydrocarbon stream A may for example comprise:
≥25.0 and ≤95.0 wt %, preferably ≥25.0 and ≤80.0 wt %, more preferably ≥25.0 and ≤70.0 wt %, of n-paraffins; and/or ≥5.0 and ≤70.0 wt %, preferably ≥5.0 and ≤50.0 wt %, more preferably ≥7.5 and ≤40.0 wt %, of iso-paraffins; and/or ≤5.0 wt %, preferably ≤2.0 wt %, more preferably 1.0 wt %, of olefins; and/or ≥5.0 and ≤20.0 wt %, preferably ≥5.0 and ≤15.0 wt %, more preferably ≥7.5 and ≤15.0 wt %, of naphtenes; and/or ≥5.0 and ≤15.0 wt %, preferably ≥5.0 and ≤12.5 wt %, more preferably ≥7.5 and ≤12.5 wt %, of aromatics with regard to the total weight of the hydrocarbon stream A.

The hydrocarbon stream A may for example comprise a certain quantity of contaminants. For example, the hydrocarbon stream A may contain a quantity of compounds comprising chlorine atoms. The quantity of compounds comprising chlorine atoms may be expressed as the atomic chlorine content of the hydrocarbon stream A. For example, the hydrocarbon stream A may have an atomic chlorine content of <10 ppm by weight, as determined in accordance with ASTM UOP 779-08, preferably <5 ppm, more preferably <2 ppm.

The hydrocarbon stream A may comprise a quantity of compounds comprising nitrogen atoms. The quantity of compounds comprising nitrogen atoms may be expressed as the atomic nitrogen content of the hydrocarbon stream A. For example, the hydrocarbon stream A may have an atomic nitrogen content of <50 ppm by as determined in accordance with ASTM D4629 (2017), preferably <10 ppm, more preferably <5 ppm, even more preferably <2 ppm.

The hydrocarbon stream A may comprise a quantity of compounds containing olefinic unsaturations. An indication for the quantity of olefinic unsaturations is the bromine number of the hydrocarbon stream. The bromine number indicates the quantity of bromine in g that reacts with 100 g of the hydrocarbon specimen when tested under the conditions of ASTM D1159-07 (2012). For example, the hydrocarbon stream A as used in the process of the present invention may have a bromine number of <10, preferably <7.5, more preferably <5.0, even more preferably <3.0, even more preferably <1.0.

The hydrocarbon stream A may comprise a quantity of compounds containing sulfur. The quantity of compounds containing sulphur may be determined as the total sulfur content in accordance with ASTM D5453 (2012). For example, the hydrocarbon stream A may have a total sulfur content of <500 ppm, preferably <300 ppm, more preferably <100 ppm, even more preferably <50 ppm.

It has to be understood that all values expressed herein as ppm reflect parts per million by weight.

It is preferred that the hydrocarbon stream B has an initial boiling point >25° C. and a final boiling point of <350° C., wherein the initial boiling point and the final boiling point are determined in accordance with ASTM D86 (2012).

The hydrocarbon stream B may for example have an initial boiling point of >25° C., preferably of >30° C., more preferably of >35° C., even more preferably of >40° C. The hydrocarbon stream B may for example have an initial boiling point of <100° C., preferably <90° C., more preferably <80° C., even more preferably <70° C., or <60° C., or <50° C.

The hydrocarbon stream B may for example have a final boiling point of <350° C., preferably of <325° C., more preferably of <300° C., even more preferably of <275° C., even more preferably of <250° C., or <225° C., or <200° C. The hydrocarbon stream B may for example have a final boiling point of >150° C., preferably >175° C., more preferably >200° C., even more preferably >250° C., or >275° C., or >300° C.

The hydrocarbon stream B may for example comprise ≥25.0 and ≤95.0 wt % of n-paraffins, with regard to the total weight of the hydrocarbon stream B. Preferably, the stream A comprises ≥25.0 and ≤80.0 wt % of n-paraffins, more preferably ≥25.0 and ≤50.0 wt %.

The hydrocarbon stream B may for example comprise ≥5.0 and ≤40.0 wt % of iso-paraffins, with regard to the total weight of the hydrocarbon stream B. Preferably, the hydrocarbon stream B comprises ≥5.0 and ≤30.0 wt % of iso-paraffins, more preferably ≥7.5 wt % and ≤25.0 wt %.

The hydrocarbon stream B may for example comprise ≤2.0 wt % of olefins, with regard to the total weight of the hydrocarbon stream B. Preferably, the hydrocarbon stream B comprises ≤1.5 wt % of olefins, more preferably ≤1.0 wt %, even more preferably ≤0.5 wt %.

The hydrocarbon stream B may for example comprise ≥0.01 and ≤2.0 wt % of olefins, with regard to the total weight of the hydrocarbon stream B. Preferably, the hydrocarbon stream B comprises ≥0.01 and ≤1.5 wt % of olefins, more preferably ≥0.01 and ≤1.0 wt %.

The hydrocarbon stream B may for example comprise ≥0.5 and ≤50.0 wt % of napththenes, with regard to the total weight of the hydrocarbon stream B. Preferably, the hydrocarbon stream B comprises ≥5.0 and ≤40.0 wt % of naphthenes, more preferably ≥7.5 wt % and ≤30.0 wt %.

The hydrocarbon stream B may for example comprise ≥0.5 and ≤50.0 wt % of aromatics, with regard to the total weight of the hydrocarbon stream B. Preferably, the hydrocarbon stream B comprises ≥5.0 and ≤25.0 wt % of aromatics, more preferably ≥7.5 wt % and ≤20.0 wt %.

The hydrocarbon stream B may for example comprise:
≥25.0 and ≤95.0 wt %, preferably ≥25.0 and ≤80.0 wt %, more preferably ≥25.0 and ≤50.0 wt %, of n-paraffins; and/or
≥5.0 and ≤40.0 wt %, preferably ≥5.0 and ≤30.0 wt %, more preferably ≥7.5 and ≤25.0 wt %, of iso-paraffins; and/or
≤2.0 wt %, preferably ≥0.01 and ≤1.5 wt %, more preferably ≥0.01 and ≤1.0 wt %, of olefins; and/or
≥0.5 and ≤50.0 wt %, preferably ≥5.0 and ≤40.0 wt %, more preferably ≥7.5 and ≤30.0 wt %, of naphtenes; and/or
≥0.5 and ≤50.0 wt %, preferably ≥5.0 and ≤25.0 wt %, more preferably ≥7.5 and ≤20.0 wt %, of aromatics
with regard to the total weight of the hydrocarbon stream B.

The fraction of olefins $F_{O,C}$ in the feed C may be calculated as:

$$F_{O,C} = F_{O,A} * F_{A,C} + F_{O,B} * F_{B,C}$$

Wherein:
$F_{O,C}$ is the weight fraction of olefins in feed C, in wt %, with regard to the total weight of feed C;
$F_{O,A}$ is the weight fraction of olefins in the hydrocarbon stream A, in wt %, with regard to the total weight of hydrocarbon stream A;
$F_{O,B}$ is the weight fraction of olefins in the hydrocarbon stream B, in wt %, with regard to the total weight of hydrocarbon stream B;
$F_{A,C}$ is the weight fraction of hydrocarbon stream A in feed C, with regard to the total weight of feed C; and
$F_{B,C}$ is the weight fraction of hydrocarbon stream B in feed C, with regard to the total weight of feed C.

It is preferred that the fraction of olefins $F_{O,C}$ in the feed C is ≤2.0, preferably ≤1.8, more preferably ≤1.6, even more preferably ≤1.5 wt % with regard to the total weight of feed C.

The feed C that is supplied to the thermal cracker furnace comprises a fraction of the hydrocarbon stream A and a fraction of the hydrocarbon stream B.

The feed C may be supplied to the thermal cracker furnace via one or more inlet(s) wherein the fraction of the hydrocarbon stream A and the hydrocarbon stream B are combined prior to entering the thermal cracking furnace. Alternatively, the feed C may be supplied to the thermal cracking furnace in such way that the fraction of hydrocarbon stream A and the fraction of the hydrocarbon stream B enter the furnace via separate inlets.

The feed C may for example be a pre-mixed composition comprising a fraction of hydrocarbon stream A and a fraction of hydrocarbon stream B, wherein the feed C is supplied to the thermal cracking furnace as a mix via one or more inlets, or alternatively may be the total quantity of hydrocarbon stream A and hydrocarbon stream B, wherein the feed C is supplied to the thermal cracking furnace as separate streams of A and B, via one or more inlet(s) for each stream.

In the process of the present invention, the coil outlet temperature (COT) of the steam cracker furnace is ≥800 and ≤870° C., preferably ≥810 and ≤870° C., more preferably ≥820 and ≤870° C. Operating the cracker furnace in this temperature range of COT allows for cracking the feedstock to a desired product slate, whilst ensuring a sustainable and durable operation of the cracker furnace.

The feed C may for example comprise a quantity of ≤99.0 wt, or ≤95.0 wt, or ≤90.0 wt % of hydrocarbon stream A, with regard to the total weight of feed C, for example ≤75.0 wt %, for example ≤60.0 wt %, for example ≤50.0 wt %, for example ≤40.0 wt %, for example ≤25.0 wt %, for example ≤20.0 wt %, for example ≤10.0 wt %. The feed C may for example comprise a quantity of ≥5.0 wt % of hydrocarbon stream A, preferably ≥10.0 wt %, more preferably ≥20.0 wt %, even more preferably ≥30.0 wt %, even more preferably ≥40.0 wt %, even more preferably ≥50.0 wt %, or ≥70.0 wt %, or ≥90.0 wt %. The feed C may for example comprise a quantity of ≥5.0 and ≤99.0 wt % of hydrocarbon stream A, preferably ≥5.0 and ≤95.0 wt %, more preferably ≥5.0 and ≤90.0 wt %, more preferably ≥10.0 and ≤75.0 wt %, more preferably ≥20.0 and ≤60.0 wt %.

In a certain embodiment, the feed C may consist of hydrocarbon stream A.

Such operation of the process of the invention presents as benefit that is allows for the use of a hydrocarbon stream A that is obtained as liquid stream from hydrotreatment step subsequent to a pyrolysis unit. This allows for the conversion of waste plastics as a certain major fraction of a feed for a thermal cracking furnace, and thereby contributes to process economics of the conversion of waste plastics to new virgin polyethylene.

For example, the feed C may for example comprise a quantity of ≥5.0 and ≤90.0 wt % of hydrocarbon stream A, preferably ≥10.0 and ≤75.0 wt %, more preferably ≥20.0 and ≤60.0 wt %, or may consist of hydrocarbon stream A, preferably wherein hydrocarbon stream A is obtained as liquid stream from a hydrotreatment unit. In such embodiment, the hydrocarbon stream A may have:
- an atomic chlorine content of <10 ppm by weight as determined in accordance with ASTM UOP 779-08; and/or
- an atomic nitrogen content of <50 ppm by weight as determined in accordance with ASTM D5762 (2012); and/or
- a bromine number of <10 as determined in accordance with ASTM D1159-07 (2012); and/or
- a sulfur content of <500 ppm as determined in accordance with ASTM D5453 (2012).

After the thermal cracking operation (d) is performed, a cracked hydrocarbon stream D is obtained from the thermal cracking furnace. The composition of the cracked hydrocarbon stream D depends on the composition of the feed stream C. Typically, a cracked hydrocarbon stream comprises mono-olefins such as ethylene, propylene, butylenes, di-olefins such as butadiene, and aromatic compounds. In view of optimised process utilisation, it is desired that the quantity of ethylene and propylene in the cracked hydrocarbon stream 0 is high. The cracked hydrocarbon stream D may for example comprise ≥40.0 wt % of the total of ethylene and propylene, with regard to the total weight of the stream D. Preferably, the stream D may comprise ≥45.0 wt % of the total of ethylene and propylene, more preferably ≥50.0 wt % of the total of ethylene and propylene.

The process of the present invention allows for production of a particularly high quantity of ethylene as part of the cracked hydrocarbon stream D. For example, the quantity of ethylene in the stream D may be ≥20.0 wt %, preferably ≥22.5 wt %, more preferably ≥25.0 wt %, even more preferably ≥27.5 wt %, even more preferably ≥30.0 wt %.

Upon exiting the thermal cracking furnace, the cracked hydrocarbon stream D is supplied to a separation unit. In the separation unit, a separation operation is performed to obtain a product stream E comprising ethylene.

It is preferred that the product stream E comprises 99.9 vol % of ethylene, with regard to the total weight of the product stream E. It is preferred that the product stream E comprises ≤1000 ppm by vol. of the total of ethane and methane. It is preferred that the product stream E comprises ≤5 ppm by vol. of oxygen. Such high purity is required to enable subsequent polymerisation to be performed without disturbance of the polymerisation process. For example, the presence of an excess of impurities in the product stream E may lead to deactivation of catalyst in catalytic polymerisation processes.

Subsequent to the separation operation (f), the obtained product stream E is supplied to a polymerisation reactor. In such polymerisation reactor, a polymerisation reaction (h) is performed to obtain an ethylene-based polymer.

The polymerisation reaction may be a solution polymerisation reaction, a gas-phase polymerisation reaction, a slurry polymerisation reaction, or a free-radical polymerisation reaction.

In a particular embodiment, the polymerisation reaction of step (h) is a gas-phase polymerisation process. Such gas-phase polymerisation process may be performed in the presence of a catalyst system for the polymerisation of ethylene. Such catalyst system may for example be a Ziegler-Natta type catalyst system, a single-site type catalyst system such as a metallocene-type catalyst system, a chromium-type catalyst system, or any other catalyst system known in the art that is suitable for polymerisation of ethylene in a gas-phase process.

Such gas-phase polymerisation process may be a homopolymerisation process or a copolymerisation process. For example, 1-butene, 4-methyl-1-pentene, 1-hexene or 1-octene may be used as co-monomers in such copolymerisation process.

A particular gas-phase polymerisation processes that may be used for the polymerisation reaction of step (h) of the present invention is a fluidised-bed polymerisation process. In such process, the formed polyethylene particles are maintained in a fluidised state by upwards flow of the reactant gases, comprising ethylene, during the time that the reaction takes place, wherein once the particles are concluded to have reached the desired degree of polymerisation, they are evacuated from the reactor together with the gaseous medium which is subsequently separated from the formed particles and recycled as reactant, together with a make-up stream to compensate the reactant consumption.

Such fluidised-bed process is particularly desirable as it allows for polymerisation of ethylene at relatively moderate levels of energy consumption, combined with a relatively moderate capital investment that is required.

Accordingly, use of a fluidised-bed gas-phase polymerisation process for the polymerisation reaction of step (h) of the present process may contribute to the overall carbon efficiency of the process of the invention as a result of the reduced energy requirements.

In a particular embodiment, the invention relates to a free-radical polymerisation reaction. Such free-radical polymerisation reaction involves reaction of the product stream E at a pressure of ≥100 MPa, preferably ≥150 MPa, more preferably ≥200 MPa, even more preferably ≥225 MPa. Such free-radical polymerisation reaction involves reaction of the product stream E at a pressure of ≤350 MPa, preferably ≤325 MPa, more preferably ≤300 MPa, even more preferably ≤275 MPa. Such free-radical polymerisation may for example be performed in the presence of a free-radical reaction initiator, such as a peroxide.

Such free-radical polymerisation reaction may for example be performed in an autoclave reactor vessel or alternatively in a tubular reaction vessel, wherein the product stream E is supplied to an inlet at a first end of the tubular vessel, and a product stream comprising the polymeric product is evacuated from an outlet at the second end of the tubular vessel.

In certain embodiments of the present invention, the polymerisation reaction in step (h) may for example be:
I. a free-radical polymerisation process performed at a pressure of >150 MPa;
II. a gas-phase polymerisation process performed in the presence of a catalyst system for the polymerisation of ethylene;
III. a solution polymerisation process performed in the presence of a catalyst system for the polymerisation of ethylene;
IV. a slurry polymerisation process performed in the presence of a catalyst system for the polymerisation of ethylene; or
V. a process comprising multiple of the processes I through IV.

In a certain embodiment, the invention also relates to a process for the production of ethylene from waste plastics feedstocks comprising the steps in this order of:
(a) providing a hydrocarbon stream A obtained by hydrotreatment of a pyrolysis oil produced from a waste plastics feedstock;
(b) optionally providing a hydrocarbon stream B;
(c) supplying a feed C comprising a fraction of the hydrocarbon stream A and optionally a fraction of the hydrocarbon stream B to a thermal cracker furnace comprising cracking coil(s);
(d) performing a thermal cracking operation in the presence of steam to obtain a cracked hydrocarbon stream D;
(e) supplying the cracked hydrocarbon stream D to a separation unit; and
(f) performing a separation operation in the separation unit to obtain a product stream E comprising ethylene;
wherein in step (d):
the coil outlet temperature is >800 and <870° C., preferably ≥820 and ≤870° C.; and
the weight ratio of steam to composition C is >0.3 and <0.8.

In such embodiment, hydrocarbon stream A may for example have
an initial boiling point as determined in accordance with ASTM 086 (2012) of >25° C.;
a final boiling point as determined in accordance with ASTM D86 (2012) of <350° C.;
an atomic chlorine content of <10 ppm by weight as determined in accordance with ASTM UOP 779-08;
an atomic nitrogen content of <50 ppm by weight as determined in accordance with ASTM D4629 (2017); and/or
a bromine number of <10 as determined in accordance with ASTM D1159-07 (2012); and/or
a total sulfur content of <500 ppm as determined in accordance with ASTM D5453 (2012).

Further in such embodiment, in step (c), the feed C consist of the hydrocarbon stream A, or may comprise ≥5.0 and ≤90.0 wt %, preferably ≥20.0 and ≤60.0 wt % of hydrocarbon stream A, with regard to the total weight of feed C.

The invention will now be illustrated by the following non-limiting examples. The presented values for the examples have been obtained by modelling steam cracking operations of various feedstocks using as modelling software the Spyro 6.5 package, a commercially available modelling software package obtainable from Technip/Pyrotec.

Modelling was performed using feedstocks having the compositions as set out below in table 1.

TABLE 1

Compositions of feedstocks used in modelling via Spyro 6.5.

|  | FF | HT |
| --- | --- | --- |
| n-paraffins | 30 | 51 |
| iso-paraffins | 32 | 30 |
| olefins | 0 | 0.7 |
| napthenes | 19 | 8 |
| aromatics | 19 | 10 |

Wherein the percentage as expressed represents a weight percentage of the respective fractions with regard to the total weight of the feedstock.

FF is a conventional fossil feedstock of the naphtha range and corresponds to hydrocarbon stream B as defined in the current invention. HT is a feed obtained as liquid stream from the hydrotreatment of a liquid stream obtained from the pyrolysis of waste plastics and corresponds to hydrocarbon stream A as defined in the current invention.

Using the above feedstocks, a number of calculations using the Spyro 6.5 package were performed according to the conditions set out below in table 2.

TABLE 2

Conditions for modelling in Spyro 6.5.

| Experiment | Feed | COT | S/O |
| --- | --- | --- | --- |
| 1A | 100% FF | 810 | 0.35 |
| 1B | 5.0% HT; 95.0% FF | 810 | 0.35 |
| 1C | 10.0% PY; 90.0% FF | 810 | 0.35 |
| 1D | 100% HT | 810 | 0.35 |
| 2A | 100% FF | 820 | 0.35 |
| 2B | 5.0% PY; 95.0% FF | 820 | 0.35 |
| 2C | 10.0% PY; 90.0% FF | 820 | 0.35 |
| 2D | 100% HT | 820 | 0.35 |
| 3A | 100% FF | 840 | 0.35 |
| 3B | 5.0% PY; 95.0% FF | 840 | 0.35 |
| 3C | 10.0% PY; 90.0% FF | 840 | 0.35 |
| 3D | 100% HT | 840 | 0.35 |
| 4A | 100% FF | 860 | 0.35 |
| 4B | 5.0% PY; 95.0% FF | 860 | 0.35 |
| 4C | 10.0% PY; 90.0% FF | 860 | 0.35 |
| 4D | 100% HT | 860 | 0.35 |

Wherein:
Feed is the composition of feed 0, wherein the percentages are in wt % of each of the feedstocks with regard to the total weight of feed C.
COT is the coil outlet temperature of the steam cracker furnace, in 00.
S/O is the weight ratio of steam to feed C.

Using the above conditions, the model calculations provided the product slate of the cracking operations performed for each of the listed experiments, results of which are presented below.

| Experiment | C2= | C2 = increase | Energy saving |
|---|---|---|---|
| 1A | 23.13 | | |
| 1B | 23.44 | 1.34% | 0.75% |
| 1C | 23.74 | 2.63% | 1.48% |
| 1D | 29.21 | 26.29% | 11.45% |
| 2A | 23.89 | | |
| 2B | 24.19 | 1.26% | 0.72% |
| 2C | 24.49 | 2.51% | 1.41% |
| 2D | 29.76 | 24.57% | 10.85% |
| 3A | 25.24 | | |
| 3B | 25.53 | 1.15% | 0.62% |
| 3C | 25.81 | 2.26% | 1.24% |
| 3D | 30.73 | 21.75% | 9.80% |
| 4A | 26.39 | | |
| 4B | 26.67 | 1.06% | 0.62% |
| 4C | 26.94 | 2.08% | 1.17% |
| 4D | 31.59 | 19.70% | 9.10% |

Wherein:

C2=is the wt % of ethylene as part of the cracked hydrocarbon stream, corresponding to the cracked hydrocarbon stream D as defined in the present invention.

C2=increase is the increase in ethylene as part of the cracked hydrocarbon stream in wt % as compared to the ethylene fraction produced using 100% of feed FF.

Energy saving is the reduction of fuel gas consumption in the cracking operation in GJ per ton of ethylene produced, expressed in %, as compared to the energy consumption using 100% of feed FF.

As indicated by the results of the cracker modelling above, the process according to the present invention allows for the optimization of yield of polyethylene and reduction of energy to produce the polyethylene, whilst allowing for a circular use of waste plastics given the feedstock being based on waste plastics.

The invention claimed is:

1. Process for the production of ethylene-based polymers from waste plastics feedstocks comprising the steps in an order of:
   (a) pyrolyzing a waste plastics feedstock to obtain a pyrolysis oil, and hydrotreating the pyrolysis oil to obtain a liquid product, which is a hydrocarbon stream A comprising ≥25.0 and ≤70% of n-paraffins, ≥7.5 and ≤40.0 wt % of iso-paraffins; ≤1.0 wt % of olefins; ≥7.5 and ≤15.0 wt % of napthenes; and ≥7.5 and ≤12.5 wt % of aromatics; with regard to the total weight of the hydrocarbon stream A;
   (b) optionally providing a hydrocarbon stream B;
   (c) supplying a feed C comprising a fraction of the hydrocarbon stream A and optionally a fraction of the hydrocarbon stream B to a thermal cracker furnace comprising cracking coil(s);
   (d) performing a thermal cracking operation in the presence of steam to obtain a cracked hydrocarbon stream D;
   (e) supplying the cracked hydrocarbon stream D to a separation unit;
   (f) performing a separation operation in the separation unit to obtain a product stream E comprising ethylene;
   (g) supplying the product stream E to a polymerisation reactor; and
   (h) performing a polymerisation reaction in the polymerisation reactor to obtain an ethylene-based polymer;
wherein in step (d):
   the coil outlet temperature is ≥800 and ≤870° C.; and
   the weight ratio of steam to feed C is >0.3 and <0.8.

2. Process according to claim 1, wherein the hydrocarbon stream A has an initial boiling point of >25° C. and a final boiling point of <350° C., wherein the initial boiling point and the final boiling point are determined in accordance with ASTM D86 (2012).

3. Process according to claim 1, wherein the hydrocarbon stream A has an atomic chlorine content of <10 ppm by weight as determined in accordance with ASTM UOP 779-08.

4. Process according to claim 1, wherein the hydrocarbon stream A has an atomic nitrogen content of <50 ppm by weight as determined in accordance with ASTM D4629 (2017).

5. Process according to claim 1 wherein the hydrocarbon stream A has a bromine number of <10 as determined in accordance with ASTM D1159-07 (2012).

6. Process according to claim 1 wherein the hydrocarbon stream A has a total sulfur content of <500 ppm as determined in accordance with ASTM D5453 (2012).

7. Process according to claim 1, wherein in step (c), the feed C consists of the hydrocarbon stream A.

8. Process according to claim 1, wherein the waste plastics feedstock comprises ≥90.0 wt % of polymeric material, with regard to the total weight of the waste plastics feedstock.

9. Process according to claim 1, wherein the waste plastics feedstock comprises
   <20.0 wt %, of polyesters; and/or
   <20.0 wt %, of polyamides; and/or
   <2.0 wt %, of polyvinyl chloride
with regard to the total weight of polymeric material in the waste plastics feedstock.

10. Process according to claim 1, wherein the waste plastics feedstock comprises ≤10.0 wt % of ingredients being the sum of the content of glass, paper, metal, cardboard, compostable waste, wood, stone, textiles, rubber materials and superabsorbent hygiene products, with regard to the total weight of the waste plastics feedstock.

11. Process according to claim 1, wherein the polymerisation is
   I. a free-radical polymerisation process performed at a pressure of >150 MPa;
   II. a gas-phase polymerisation process performed in the presence of a catalyst system for the polymerisation of ethylene;
   III. a solution polymerisation process performed in the presence of a catalyst system for the polymerisation of ethylene;
   IV. a slurry polymerisation process performed in the presence of a catalyst system for the polymerisation of ethylene; or
   V. a process comprising multiple of the processes I through IV.

12. Process according to claim 1, wherein in step (c), the feed C comprises ≥5.0 and ≤90.0 wt %, of hydrocarbon stream A, with regard to the total weight of feed C.

13. Process according to claim 12, wherein
   the hydrocarbon stream B comprises:
   ≥25.0 and ≤95.0 wt %, of n-paraffins; and/or
   ≥5.0 and ≤40.0 wt %, of iso-paraffins; and/or
   ≤2.0 wt %, of olefins; and/or
   ≥0.5 and ≤50.0 wt %, of napthenes; and/or
   ≥0.5 and ≤50.0 wt %, of aromatics
   with regard to the total weight of the hydrocarbon stream B.

14. Process according to claim 12, wherein the hydrocarbon stream B comprises:
≥25.0 and ≤50.0 wt %, of n-paraffins; and
≥7.5 and ≤25.0 wt %, of iso-paraffins; and
≥0.01 and ≤1.0 wt %, of olefins; and
≥7.5 and ≤30.0 wt %, of napthenes; and
≥7.5 and ≤20.0 wt %, of aromatics
with regard to the total weight of the hydrocarbon stream B.

15. Process for the production of ethylene from waste plastics feedstocks comprising the steps in an order of:
(a) pyrolyzing a waste plastic feedstock to obtain a pyrolysis oil, and hydrotreating the pyrolysis oil to obtain a liquid product, which is a hydrocarbon stream A comprising ≥25.0 and ≤70% of n-paraffins, ≥7.5 and ≤40.0 wt % of iso-paraffins; ≤1.0 wt % of olefins; ≥7.5 and ≤15.0 wt % of napthenes; and ≥7.5 and ≤12.5 wt % of aromatics; with regard to the total weight of the hydrocarbon stream A;
(b) optionally providing a hydrocarbon stream B;
(c) supplying a feed C comprising a fraction of the hydrocarbon stream A and optionally a fraction of the hydrocarbon stream B to a thermal cracker furnace comprising cracking coil(s);
(d) performing a thermal cracking operation in the presence of steam to obtain a cracked hydrocarbon stream D;
(e) supplying the cracked hydrocarbon stream D to a separation unit; and
(f) performing a separation operation in the separation unit to obtain a product stream E comprising ethylene;
wherein in step (d):
the coil outlet temperature is ≥800 and ≤870° C.; and
the weight ratio of steam to composition C is >0.3 and <0.8.

16. Process according to claim 15, wherein the hydrocarbon stream A has
an initial boiling point as determined in accordance with ASTM D86 (2012) of >25° C.;
a final boiling point as determined in accordance with ASTM D86 (2012) of <350° C.;
an atomic chlorine content of <10 ppm by weight as determined in accordance with ASTM UOP 779-08;
an atomic nitrogen content of <100 ppm by weight as determined in accordance with ASTM D4629 (2017); and/or
a bromine number of <10 as determined in accordance with ASTM D1159-07 (2012); and/or
a total sulfur content of <500 ppm as determined in accordance with ASTM D5453 (2012).

17. Process according to claim 15, wherein in step (c), the feed C consists of the hydrocarbon stream A.

18. Process according to claim 15, wherein in step (c), the feed C comprises ≥5.0 and ≤90.0 wt %, of hydrocarbon stream A, with regard to the total weight of feed C.

* * * * *